United States Patent
Schang et al.

(10) Patent No.: US 8,721,498 B2
(45) Date of Patent: May 13, 2014

(54) METHOD FOR CRANKSHAFT TORQUE MODIFICATION DURING TRANSMISSION SHIFTS USING MULTIPLE TORQUE ACTUATORS AND CONTROL SYSTEM FOR SAME

(75) Inventors: Mark A Schang, Milford, MI (US); Robert L. Williams, Holly, MI (US); David Szpara, Milford, MI (US)

(73) Assignee: GM Global Technologies Operations LLC, Detroit, MI (US)

( * ) Notice: Subject to any disclaimer, the term of this patent is extended or adjusted under 35 U.S.C. 154(b) by 446 days.

(21) Appl. No.: 13/213,337

(22) Filed: Aug. 19, 2011

(65) Prior Publication Data

US 2013/0045835 A1 Feb. 21, 2013

(51) Int. Cl.
*B60W 10/10* (2012.01)
(52) U.S. Cl.
USPC .......................................... 477/111

(58) Field of Classification Search
None
See application file for complete search history.

(56) References Cited

U.S. PATENT DOCUMENTS

| | | | |
|---|---|---|---|
| 4,724,723 A * | 2/1988 | Lockhart et al. | 477/102 |
| 6,364,811 B1 | 4/2002 | Hubbard et al. | |
| 7,462,129 B2 * | 12/2008 | Hrovat et al. | 477/107 |
| 2011/0144887 A1 | 6/2011 | Whitney et al. | |
| 2012/0083993 A1 * | 4/2012 | Shibata et al. | 701/103 |
| 2012/0130609 A1 * | 5/2012 | Jess et al. | 701/54 |

* cited by examiner

*Primary Examiner* — Erin D Bishop
*Assistant Examiner* — Huan Le
(74) *Attorney, Agent, or Firm* — Quinn Law Group, PLLC (57) ABSTRACT

A method of controlling engine crankshaft torque on a vehicle requests crankshaft torque modification using multiple types of torque actuators prior to and during a single commanded shift, such as an upshift. Appropriate levels of torque modification for the request, as well as appropriate times to make determinations regarding actuator type and make crankshaft torque reduction requests are determined in light of timing of key events during the shift.

20 Claims, 6 Drawing Sheets

METHOD FOR CRANKSHAFT TORQUE MODIFICATION DURING TRANSMISSION SHIFTS USING MULTIPLE TORQUE ACTUATORS AND CONTROL SYSTEM FOR SAME

TECHNICAL FIELD

The invention relates to a method of requesting crankshaft torque modification during a transmission shift using multiple torque actuators during the same shift, and a control system that carries out the method.

BACKGROUND

Automatic transmissions typically will use a torque reduction of the engine when performing an upshift. An upshift is when the transmission shifts from a gear with a higher numerical multiplication ratio to a lower numerical multiplication ratio, such as a shift from second gear to third gear. When this is done, the engine speed must slow down to provide a speed that corresponds with the transmission output speed multiplied by the transmission gear block ratio. To slow down the engine faster without wearing the transmission clutch material excessively or providing an acceleration to the driver, the engine torque is decreased quickly and then brought back up to a torque corresponding with the transmission output torque.

The airflow torque (i.e., engine torque affected by the throttle, a turbobooster system and/or a supercharger system, and valve phasers) during an automatic transmission upshift will typically increase during the shift because it takes a higher engine torque to make the same axle torque with a lower numerical ratio gear. There is typically a delay between requesting an airflow torque and achieving it.

In known systems, during an upshift, the transmission control module will usually issue an immediate torque reduction request that is satisfied with spark retard. The spark retard takes energy out of the combustion event and puts it into the exhaust system as heat. The immediate torque request brings down the engine torque to be able to aid in bringing down the engine speed during the shift. Toward the end of the shift, the immediate torque request will start ramping up again (i.e., request a higher torque value) to give torque back to the normal driver control path (based on the airflow request and sent from the engine controller to the transmission controller) with optimal efficiency.

SUMMARY

The use of spark retard for torque reduction during a shift is advantageous because it is a fast actuator that can remove torque quickly and bring it back quickly, providing a finely tuned control of crankshaft torque. Furthermore, spark retard does not significantly impact emissions unless retarded to such a degree as to cause engine misfire. However, spark retard may negatively impact fuel economy, because the same amount of fuel is injected when the spark is retarded, causing a larger amount of the combustion event energy to be wasted as heat in the exhaust rather than converted to mechanical work into the engine.

There is a need for transmissions capable of shorter shift times and greater range of authority under some operating conditions than what can be delivered with spark retard alone. As used herein, "range of authority" means the amount of torque reduction that can be achieved during a shift using a specific torque actuator or set of actuators.

A method of controlling engine crankshaft torque on a vehicle requests crankshaft torque modification using multiple types of torque actuators prior to and during a single commanded shift, such as an upshift, to exploit the strengths of the different types of torque actuators to achieve greater torque modification during the shift than if only one type, such as only a spark actuator, were used. Appropriate levels of torque modification for each type of request, as well as appropriate times to make determinations regarding actuator type and make crankshaft torque reduction requests are determined in light of timing of key events during the shift and desired shift metrics (such as shift timing and output torque). Torque modification includes torque reduction during an upshift, as well as removal of the reduction so that crankshaft torque returns to the unmanaged level (the level based on driver input, vehicle speed and transmission gear selection).

Specifically, the method compares a first threshold torque level to an estimated minimum crankshaft torque expected during a commanded shift of a transmission. The first threshold torque level is the sum of (i) a predetermined minimum crankshaft torque during the shift with torque reduction via a spark torque actuator and (ii) a first predetermined offset. The first predetermined offset may be based on a target gear of the commanded shift, engine speed and an expected crankshaft torque without torque modification.

The method requests crankshaft torque modification by an air torque actuator in addition to the spark torque actuator only if the estimated minimum crankshaft torque expected during the commanded shift is less than the first threshold torque level. The estimated minimum crankshaft torque expected during the commanded shift reflects the maximum shift torque management or a predetermined maximum upshift torque management estimate (i.e., the difference between the unmanaged crankshaft torque level and the minimum crankshaft torque expected). This estimate may be determined by an algorithm that assigns an estimate of the maximum amount of torque reduction that is expected from the clutch control algorithm, as determined by factors such as desired shift time and mechanical limitations. Because of the inherent delay in effect of an air torque actuator, the request for the air torque actuator will be made only if time remaining prior to the estimated end of the torque phase of the commanded shift is greater than the predetermined response time of the air torque actuator.

With regard to use of a fuel torque actuator in addition to the spark torque actuator (and possibly in addition to the air torque actuator), the method compares a second threshold torque level to torque requested during the commanded shift by the clutch control algorithm. Crankshaft torque modification by the fuel torque actuator is requested in addition to the spark torque actuator only if torque requested during the commanded shift by the clutch control algorithm is less than the second torque threshold level. The second torque threshold level is the predetermined minimum crankshaft torque during the shift with torque reduction via the spark torque actuator less a second predetermined offset. The fuel torque actuator may only be requested once during a commanded shift, and only if time from the estimated end of the torque phase of the commanded shift is less than a predetermined time threshold. Under certain predetermined time or torque conditions, the fuel torque actuator may be deactivated.

A control system is provided with a processor having an algorithm that carries out the method. The processor may be part of a transmission control unit, and may also have the clutch control algorithm. The requests may be made to an engine control unit that has a separate processor that determines whether to honor the requests. Alternatively, a single powertrain control unit may be used.

The method allows lower crankshaft torque levels to be requested, including friction torque or negative torque (i.e., crankshaft torque with reduction due to both the fuel torque actuator and the air torque actuator (fuel off and throttle cut)). Such low crankshaft torque levels cannot be obtained with spark-only crankshaft torque reduction. Additionally, because of the availability of other torque actuators in the same shift event, the minimum spark limit may be calibrated less aggressively (less retard), potentially reducing the possibility of engine misfire.

The above features and advantages and other features and advantages of the present invention are readily apparent from the following detailed description of the best modes for carrying out the invention when taken in connection with the accompanying drawings.

DETAILED DESCRIPTION

Figure 1:
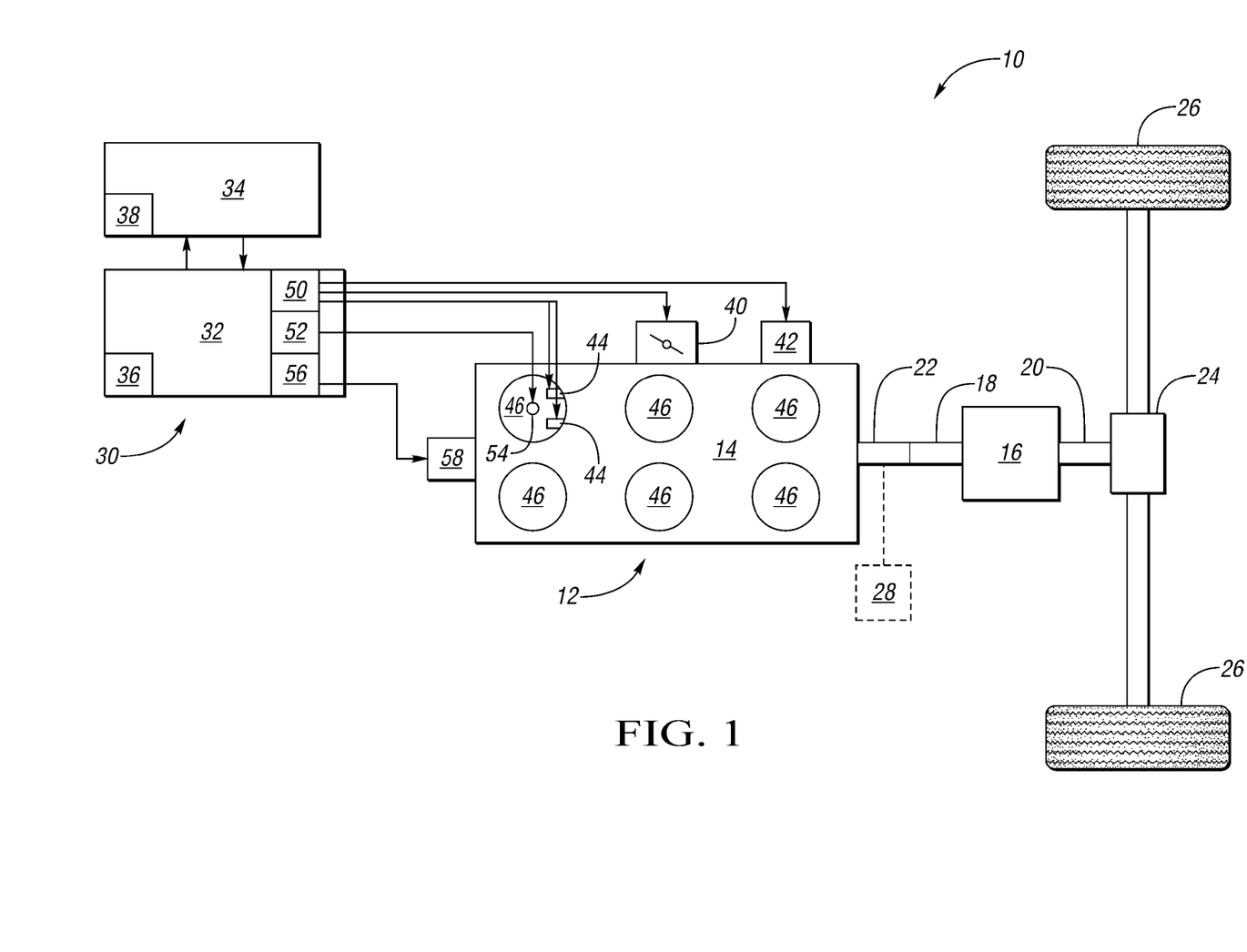
FIG. 1 is a schematic illustration of a vehicle powertrain having a control system for an engine and a transmission.

Referring to the drawings, wherein like reference numbers refer to like components throughout the several views, FIG. 1 shows a vehicle 10 having a powertrain 12 that includes an engine 14 and a transmission 16. The engine 14 is a spark-ignited internal combustion engine. In another embodiment, the engine 14 may be a diesel engine without the spark actuation discussed herein. The transmission 16 may be an automatic transmission having a plurality of intermeshing gears and selectively engageable clutches that establish different speed ratios between a transmission input member 18 and a transmission output member 20. A crankshaft 22 of the engine 14 is connectable for rotation with the transmission input member 18 to provide torque from the input member 18 to the output member 20 at a gear ratio established by the transmission 16. Torque from the output member 20 is provided through a final drive mechanism 24 to vehicle wheels 26. In some embodiments, the vehicle 10 is a hybrid vehicle having one or more electric motor/generators. For example, a motor/generator 28 may be connected with the crankshaft 22 by a belt and pulley arrangement or otherwise, and controllable to provide torque to increase torque at the crankshaft 22 or to decrease torque at the crankshaft 22, such as when operated as a generator in a regenerative braking mode.

The vehicle 10 has a control system 30 that includes an engine control module (ECM) 32 and a transmission control module (TCM) 34. The ECM 32 may be referred to as a first controller and the TCM 34 may be referred to as a second controller. The ECM 32 and TCM 34 are operatively connected with one another to coordinate control of the engine 14 and the transmission 16. Alternatively, the ECM 32 and the TCM 34 may be configured as a single powertrain control module having the functionality of both the ECM 32 and the TCM 34.

The ECM 32 has a processor 36 operable to control engine functions. For example, the processor 36 has a stored algorithm that determines torque commanded at the crankshaft 22 by the ECM 32 based on vehicle operating conditions, driver input and, as described herein, requests from the TCM 34 for torque management prior to and during transmission shifts. As further described with respect to FIG. 3, the algorithm also determines different torque capacities at the crankshaft 22 (i.e., the torque provided at the crankshaft 22) available when different torque actuators are controlled to be at different states. As used herein, a "torque actuator" is a system that varies an engine parameter that affects crankshaft torque. For example, some of the torque actuators that are controllable by the ECM 32 to modify torque at the crankshaft 22 include an airflow actuator or actuator module 50 that controls air flow to engine cylinders 46, a spark actuator or actuator module 52 that controls spark ignition timing, and a fuel actuator or actuator module 56 that controls fuel to the engine cylinders 46. The TCM 34 also has a processor 38 with an algorithm that is operable to control the timing and duration of transmission shifts, as well as to determine a range of torque reduction at the crankshaft 22 to be requested of the ECM 32 during a shift of the transmission 16, such as an upshift. The range of torque reduction requested is based at least in part on the torque capacities determined by the ECM 32.

A request for torque or an amount of torque reduction or removal of torque reduction via control of spark, fuel or electric motor/generator is referred to as an immediate torque request or a request for immediate torque, while a request for torque or an amount of torque reduction due to control of airflow is referred to as a predicted torque request or a request for predicted torque. Changes to spark timing and changes to fuel delivery, such as fuel shutoff (also referred to as fuel cut), occur relatively quickly in comparison to a change to airflow, as further discussed herein. Airflow is therefore referred to as a relatively slow torque actuator, while spark timing and fuel shutoff are referred to as relatively fast torque actuators.

The airflow actuator provided by the engine 14 affects the torque at the crankshaft 22 due to control of airflow through the throttle 40, such as by opening or closing the throttle 40 to a greater or lesser degree, control of airflow through turboboosters or superchargers 42 to affect air pressure in the engine 14, and control of airflow through cam phasers 44 that control the timing of inlet valves and exhaust valves for engine cylinders 46. The airflow actuator may be part of the airflow actuator module 50 that sends actuation signals to the throttle 40, the turbobooster and or supercharger 42 and the phasers 44. Control of torque by changes to airflow has an inherent delay between actuation or implementation of an airflow torque request and the effect of the request on crankshaft torque. Therefore, such a request is referred to as a predicted request as it is for an affect on crankshaft torque that is predicted to occur after some delay after the actuation occurs. For example, a change in throttle position will not have a full effect on crankshaft torque until air currently in the manifold and cylinders 46 is pushed through the engine 14. The response in time of crankshaft torque to a predicted torque request can vary based on many factors because of the nature of airflow control. One such factor is engine speed. Performing shifts with a predicted and immediate torque reduction can provide more overall reduction than with immediate torque reduction alone. However, more coordination of the timing of the torque requests may be necessary due to the nature of the response to predicted torque requests on gas spark-ignited engines.

The spark actuator may be a part of the spark actuation module 52 that sends actuation signals to control the timing of the spark generated by spark plugs 54 (one shown) relative to top dead center (TDC) of the pistons within the cylinders 46. For a given engine combustion mixture there is an optimum spark timing that is a function of engine speed, the amount of combustible air in the mixture, charge temperature and other factors. Timing the spark later than this optimum spark timing is referred to as spark reduction as it causes the combustion within the cylinder 46 to produce less torque at the crankshaft 22.

The fuel actuator may be part of a fuel actuation module 56 that sends actuation signals to control fuel flow such as through a fuel injector 58 for each of the cylinders 46 (one shown). When the fuel torque actuation signal is for fuel shutoff to occur, no combustion takes place in the cylinders 46 and crankshaft torque is significantly reduced.

Figure 2:
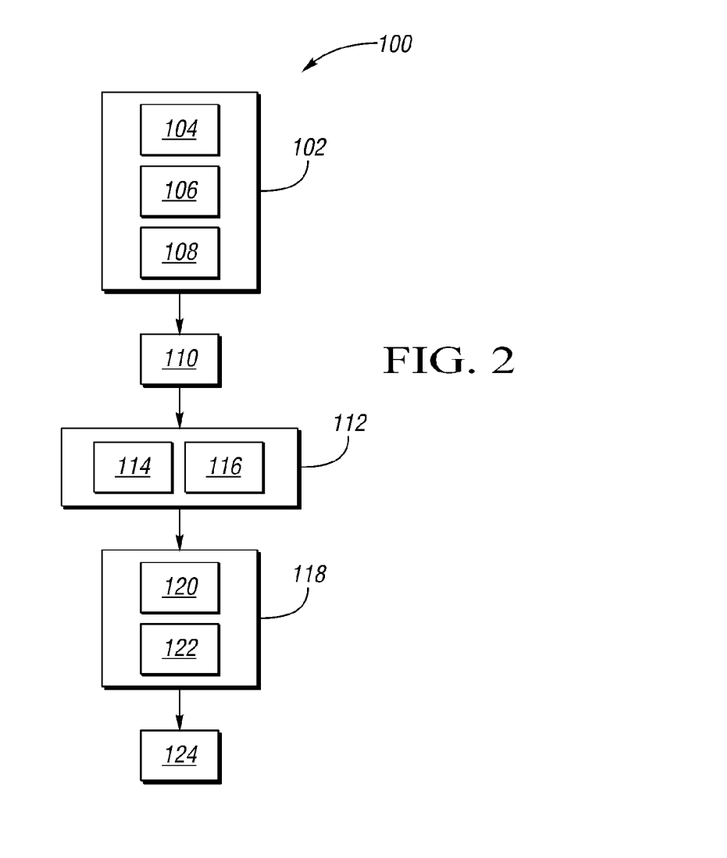
FIG. 2 is a schematic illustration of a flow diagram of a method of controlling crankshaft torque relative to a transmission shift event.
Figure 3:
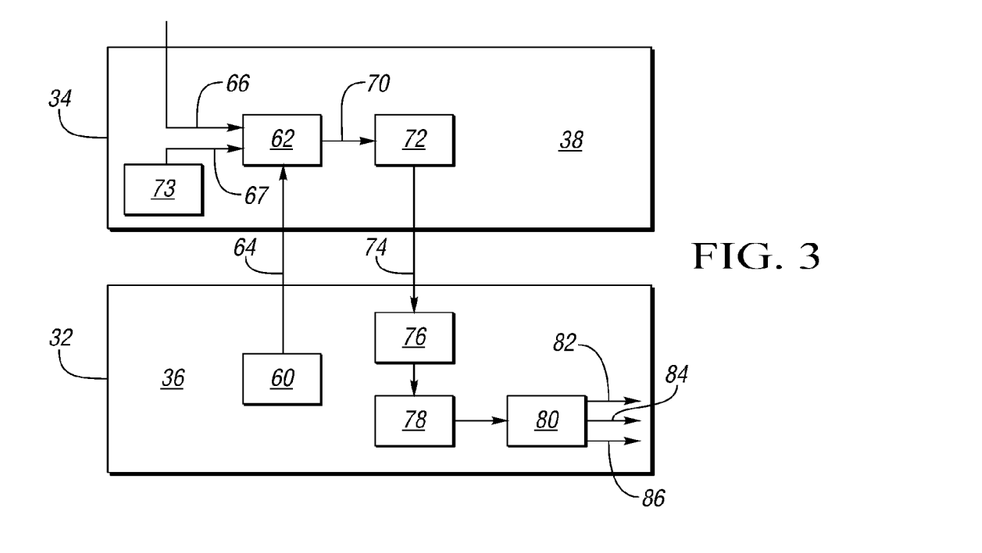
FIG. 3 is a schematic illustration of one embodiment of the control system showing inputs and outputs to algorithms that control engine torque during the shift event.

Referring to FIG. 2, a method 100 of controlling crankshaft torque prior to and during a shift in the transmission 16 is shown schematically. FIG. 3 depicts schematically the algorithms and functionality of the ECM 32 and TCM 34 that carry out the method 100 of FIG. 2. The method 100 begins with block 102, in which crankshaft torque capacities associated with different torque actuators are determined. The torque actuators include both a relatively slow torque actuator, such as an airflow actuator, as well as a relatively fast torque actuator, such as a spark actuator and/or a fuel actuator. In the embodiment shown, block 102 is carried about by the ECM 32, such as by a torque estimator algorithm 60 of the ECM 32, shown in FIG. 2. Block 102 may include blocks 104, 106 and 108. In block 104, the crankshaft torque at the current airflow (i.e., airflow response to recent settings of the throttle 40, turbobooster and/or supercharger 42, and phasers 44), with motor/generator 28 set to its maximum negative torque, and with the timing of the engine spark set for minimum spark, is determined and is communicated to the TCM 34 as one of a set of electronic signals represented by arrow 64 shown in FIG. 2. The crankshaft torque at the current airflow and with minimum spark may be referred to as "crankshaft torque minimum immediate capacity". As used herein, "minimum spark" is a predetermined setting providing a maximum amount of spark retardation without causing engine misfire. In other words, when the spark is set for minimum spark, a minimum amount of crankshaft torque that can be provided by the spark actuator module 52 is provided. Crankshaft torque minimum immediate capacity rather than engine torque minimum immediate capacity is used, especially on hybrid systems, so that the affect of an electric motor/generator, such as motor/generator 28, that can contribute to crankshaft torque is accounted for in the determination.

In block 106, the crankshaft torque with minimum airflow (i.e., settings of the throttle 40, turbobooster and/or supercharger 42, and phasers 44 to provide a minimum amount of torque possible) and with the timing of the engine spark set for minimum spark, is determined. This may be referred to as "crankshaft torque minimum run immediate capacity".

In block 108, the crankshaft torque with minimum airflow and with fuel to the cylinders 46 shutoff is determined. This may be referred to as "crankshaft torque minimum off capacity". Under these torque settings, even though fuel to the cylinders 46 is shutoff, setting the airflow to a minimum still increases the range of torque reduction that can be achieved (i.e., provides a lower magnitude torque capacity) because of increased pumping losses associated with the cylinders 46 pulling airflow across a smaller opening in the throttle when airflow is minimized.

Each of the determinations in blocks 104, 106 and 108 involves a crankshaft torque capacity achieved by a combination of a slow torque actuator (e.g., the airflow actuator) and a fast torque actuator (e.g., the spark actuator or the fuel actuator). Each of the torque capacities determined in block 102 of the method 100 are sent as electronic signals from the torque estimator algorithm 60 of the ECM 32 to a torque actuation range algorithm 62 of the TCM 34 as represented by arrow 64 of FIG. 3. The method 100 then proceeds to block 110 in which the TCM 34 determines the torque actuation range necessary from the engine 12 (as well as from the motor/generator 28 in a hybrid powertrain) in order to request the optimal combination of shift time, clutch pressures and engine torque actuation to achieve the shift. The torque actuation range algorithm 62 receives input information in the form of electronic signals, represented by arrow 66 of FIG. 3. The input information includes information that a shift has been commanded, and the target gear of the transmission gear shift. For example, if the gear shift is from second gear to third gear (i.e., an upshift), the torque actuation range algorithm 62 receives this information from other algorithms within the transmission control module 34, such as from a stored lookup table that determines an appropriate gear for the transmission 16 based on driver intent and vehicle speed. The input information also includes driver intent, as may be determined from the accelerator pedal position and any specific operation mode selected by the driver (such as sport mode, tap mode, etc.), and may be referred to as driver-requested torque. The torque actuation range algorithm 62 determines a torque actuation range over which the torque should be modified during the shift based on the torque capacity information and the additional input information received from the ECM 32.

The transmission control algorithm in the processor 38 may also associate driver-requested torque and vehicle speed with a predetermined shift duration deemed to be desirable. The shift duration may include a torque phase and an inertia phase. During the torque phase, clutches within the transmission 16 are being filled or exhausted as necessary to establish the predetermined clutch engagements for the target gear. During the inertia phase, the speed change of the crankshaft 22 occurs due to the newly established gear ratio through the transmission 16. At a relatively high vehicle speed and relatively high driver-requested axle torque or acceleration, the algorithm may assign a shorter desired shift duration than if the same shift were requested at a relatively low driver-requested axle torque. That is, the shift may be allowed to be more aggressive at high driver-requested axle torques.

Additional input information 67 to the torque actuation range algorithm 62 may include a predetermined maximum upshift torque management estimate determined by another algorithm of the processor 38 that assigns an estimate of the maximum amount of torque reduction that is expected from a clutch control algorithm 73 for the specific upshift. This estimate may be based at least in part on the mechanical limitations of the shift, such as the tooth ratios of the intermeshing gears, and desired shift characteristics such as shift time or output acceleration.

Once the torque actuation range algorithm 62 of the processor 38 of the TCM 34 determines a torque actuation range needed in order to accomplish the desired driver intent and desired shift duration, the actuation range needed is sent as an electronic signal represented by arrow 70 to a torque request algorithm 72 of the processor 38 of the TCM 34 that determines the timing, value and type of torque requests to be sent to the ECM 32. The torque requests are determined in block 112 of the method 100 by comparing the torque actuation range needed (as determined in block 110) to the torque capacities determined in block 102. In other words, because the torque reduction capabilities of the various torque actuators are known, torque requests can be made that best meet the torque actuation range needed given the available amounts of torque reduction that can be achieved by the various torque actuators.

Block 112 includes both block 114 and 116. In block 114, the method 100 determines a torque request value, and torque intervention type to be requested of the airflow actuators of the engine 12 corresponding with all points in time during a period of time just prior to an impending shift and during shift execution (i.e., prior to and during torque phase and inertia phase). The torque request value and torque intervention type for the airflow actuators are referred to as the predicted crankshaft torque request and may vary as time progresses before and during the shift. In block 114, the torque request value represents the amount of torque to be achieved at the crankshaft 22 by control of the airflow actuators. Additional substeps of block 114 relating to torque levels and timing requirements and limitations for the air torque request are described in further detail in FIG. 4.

The torque intervention type for the airflow torque request may be one of three types: no intervention, a maximum torque limit, and a minimum torque limit. A torque intervention type of no torque intervention is a request that no intervention be made with respect to the airflow actuators, and that the throttle 40, turbobooster and/or supercharger 42 and phasers 44 should not be manipulated for purposes of torque management prior to or during the shift but should remain at their current, steady-state (non-shift period) settings. A torque intervention type of a maximum torque limit is a request to set the airflow actuators so that a maximum crankshaft torque is not exceeded. This setting can be used to decrease torque from the driver-requested level. The request is for airflow actuators to be manipulated, reducing torque if necessary so that crankshaft torque does not exceed the maximum limit. A torque intervention type of a minimum torque limit is a request to set the airflow actuators so that at least a minimum crankshaft torque is provided, increasing torque if necessary, so that crankshaft torque does not fall below the minimum torque limit. This setting can be used to increase torque above the driver-requested level.

In block 116, the method 100 determines a torque request value, and torque response type to be requested of the fast torque actuators (i.e., spark actuator and fuel actuator) of the engine 12 corresponding with all points in time during a period of time just prior to an impending shift and during shift execution (i.e., prior to and during torque phase and inertia phase). The torque request value, and torque response type for the fast actuators are referred to as an immediate crankshaft torque request because there is very little delay in effect on crankshaft torque when such a torque request is commanded. The direction of an immediate torque request is typically inferred as decreasing or "maximum limit" because of the nature of spark reduction and fuel cut off to only be able to decrease torque from the driver-requested level on gasoline engines. The immediate crankshaft torque request may vary as time progresses before and during the shift. In block 116, the torque request value represents the amount of torque to be achieved at the crankshaft 22 by control of spark timing by the spark actuation module 52 and control of fuel by the fuel actuation module 56. Additional substeps of block 116 relating to torque levels and timing requirements and limitations for the fuel torque request are described in further detail in FIG. 4.

The torque response type for the immediate crankshaft torque request may be one of four types: inactive, pleasability-limited, maximum range, and automatic actuator selection. A torque response type of inactive is a request that no intervention be made with respect to the fast actuators, and that the spark timing and fuel to cylinders 46 should not be manipulated for purposes of torque management prior to or during the shift. Instead, the immediate crankshaft torque request is set to its maximum value (i.e., optimum calibrated steady-state spark timing and fuel to all cylinders 46).

A requested torque response type of "pleasability-limited" is a request for a relatively quick and smooth response with the range of torque reduction possibly limited based on the abilities of the available fast actuators. This limit on the range of torque reduction is referred to as the immediate torque minimum limit and may change with operating conditions, even during a shift. This torque response type is normally achieved with manipulation of the spark actuator only (i.e., spark retard) for a spark-ignited internal combustion engine, but may require use of additional fast actuators in other types of propulsion systems. For purposes of example only, if a current predicted crankshaft torque value is 150 Nm and a pleasability-limited request of 100 Nm is made, if the immediate torque minimum limit (the crankshaft torque value achieved with torque reduction using the spark actuator only) is 90 Nm, then the spark will be retarded and the request will be achieved. However, if the immediate minimum torque limit is 110 Nm, then the spark will be retarded to its minimum advance for combustion and the torque at the crankshaft 22 will only decrease to 110 Nm (i.e., the request will not be fully achieved). When the request is removed (at the completion of the shift), the spark will return to its calibrated level almost instantaneously.

A requested torque response type of "maximum range" is a request for a fast torque reduction at the maximum available range of crankshaft torque reduction that can be achieved using the fast actuators. The "pleasability" (i.e., smoothness) of the shift is reduced in favor of providing increased reduction range. This response is most likely achieved with both spark actuator and fuel actuator on a spark-ignited internal combustion engine, but may be achieved with other torque actuators on other types of propulsion systems. For purposes of example only, if the current predicted crankshaft torque value is 150 Nm and a torque request type of maximum range is for 100 Nm, if the maximum range torque minimum limit is −10 Nm (crankshaft torque with both fuel cutoff and spark retard), then the fuel actuator may reduce torque by 40 Nm by cutting fuel to the cylinders 46, and the spark actuator may be used to further reduce the torque by 10 Nm to 100 Nm. When the request is removed, the fuel will be turned on to the cylinders 46, and the spark timing will return to the calibrated timing, returning the crankshaft torque to the predicted torque value almost immediately. In a system that permits fuel cutoff to less than all of the cylinders 46, achieving the maximum range request may be possible with fuel cutoff to only some of the cylinders.

A requested torque response type of automatic actuator selection is a request to follow the pleasability-limited torque request but to modify the predicted crankshaft torque request value to ensure that the requested immediate torque value is achievable. Because the predicted torque actuator (i.e., the airflow actuator) may be used to achieve this request, the response rate of this request may be slower than the pleasability-limited torque response type and the maximum range torque response type. For purposes of example only, if the current predicted crankshaft torque value is 150 Nm and the automatic actuator selection torque response type request is 50 Nm (i.e., the request is to achieve a crankshaft torque value of 50 Nm), if the immediate torque minimum limit (the crankshaft torque value achieved by the spark actuator alone) is 70 Nm, then the automatic actuator selection response type request cannot be achieved by the spark actuator alone. The automatic actuator selection response type request thus includes a request to modify the predicted crankshaft torque request value to a value 20 Nm lower, and use the airflow actuator to cause the throttle 40 to be closed by an amount to reduce crankshaft torque by 20 Nm. The spark is then retarded to its minimum advance for combustion (i.e., to achieve its greatest torque reduction) so that the maximum range request of 50 Nm at the crankshaft 22 is achieved. Because the automatic actuator selection response type torque request is achieved using the airflow actuator as well as the spark actuator, when the request is removed, torque at the crankshaft 22 will not be recovered immediately, as there is a delay between the time the throttle 40 is opened and the greater airflow reaches the cylinders 46 for combustion.

The crankshaft torque requests prior to and during the shift as determined in block 112 and by the torque request algorithm 72 in FIG. 3 are then communicated to the ECM 32 as represented by arrow 74. The method 100 then moves to block 118 in which the ECM 32 evaluates the transmission torque requests in an evaluation algorithm 76 depicted in FIG. 3 that determines the settings required of the throttle 40, the turbobooster and/or supercharger 42, the cam phasers 44, the spark timing, the fuel state and the actuation command signals required from the respective actuation modules 50, 52, 56 to affect these settings and deliver the torque requests. Block 118 may include block 120, in which the method 100 arbitrates the transmission torque requests by a comparison of the transmission torque requests with other propulsion torque requests in an arbitration algorithm 78. Other propulsion torque requests may include torque reductions for engine over-speed protection, torque increases for stall prevention, or an engine shutoff request for a critical fault detected, such as a vehicle theft or a stuck throttle. In block 120, these competing requests are prioritized or used to modify the crankshaft torque request from the TCM 34.

Block 118 may also include block 122, in which an engine torque actuation algorithm 80 depicted in FIG. 3 ensures that an actuation of fuel cutoff is for cutoff to all cylinders 46 if fuel cutoff to only selected cylinders is not permitted under the predetermined actuation algorithm. Under the method 100, in block 124, actuation commands are then sent as electronic signals by the engine torque actuation algorithm 80 to the airflow actuation module 50, the spark actuation module 52, and the fuel actuation module 56, as represented by arrows 82, 84, 86, respectively.

Figure 4:
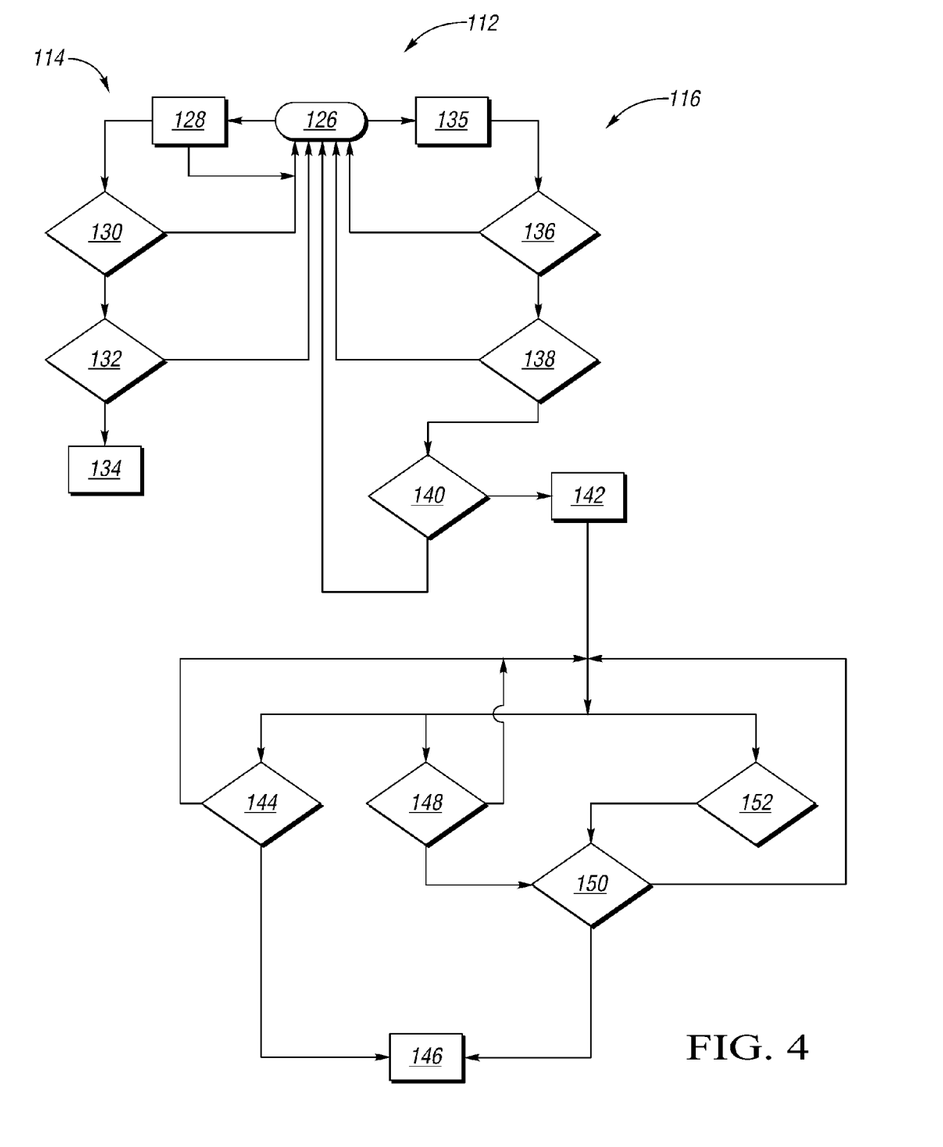
FIG. 4 is a schematic illustration of a flow diagram of a method of requesting crankshaft torque modification by an air torque actuator and/or a fuel torque actuator in addition to a spark actuator.

Referring to FIG. 4, the method of block 112 by which the torque request algorithm 72 of the processor 38 of the TCM 34 determines the timing, value and type of torque requests to be sent to the ECM 32 is shown in greater detail, with respect to the determination of both the air torque request of block 114 and the fuel torque request of block 116. Blocks 114 and 116 each have a plurality of substeps, as is indicated in FIG. 4. The method of block 112 starts at 126 and simultaneously carries out the determination of the air torque request in block 114 and the fuel torque request in block 116. Discussing the air torque determination of block 114 first, in block 128, a determination of whether or not to enable throttle cut by the air torque request is made in block 128. "Enabling" the air torque request does not necessarily mean that torque reduction by throttle cut will be carried out, but simply that it may be considered by the algorithm 72 according to the remaining substeps of the method of block 114. The enablement determination of block 128 is a function of the commanded shift and the driver mode. For example, the algorithm 72 contains stored lookup data that indicates that in some commanded shifts (i.e., a shift from first gear to second gear, or from second gear to third gear, etc.) throttle cut will not be allowed. In such an instance, the method of block 112 returns to the start 126. Additionally, torque reduction by use of the air torque actuator will be permitted only in some driver modes for each commanded shift. That is, whether the driver has selected a sport mode, a tap mode, etc., for operation of the transmission 16 will also be a factor in determining whether the throttle cut determination of block 114 will be carried out, as more aggressive torque reduction may be more desirable in some modes.

If throttle cut is enabled in block 128, the determination of the air torque request of block 114 continues to blocks 130, 132 and 134, as discussed below. The air torque request determination regarding torque request type and torque value are discussed with respect to FIGS. 5-8, which show plots of torque value increasing in the direction of arrow 160 and time progressing during a commanded upshift in the direction of arrow 162. A shift command is made at time 164 by the clutch control algorithm 73 of FIG. 3 to command an upshift from a lower gear represented as gear command line 166, such as second gear, to a higher gear, such as third gear, represented as gear command line 168. The expected crankshaft torque without torque modification by the torque request algorithm 72 of FIG. 3 is depicted at curve 170, also referred to herein as unmanaged crankshaft torque level. Engine speed during the upshift is depicted by line 172 and reflects a torque phase 174 and an inertia phase 176 of the upshift. The torque phase 174 begins when the upshift is commanded at time 164 when various clutches in the transmission 16 of FIG. 1 are emptied or filled to affect the upshift. An estimated end of the torque phase is at time 178, after which engine speed 172 begins to decrease, as expected with an upshift.

Figure 5:
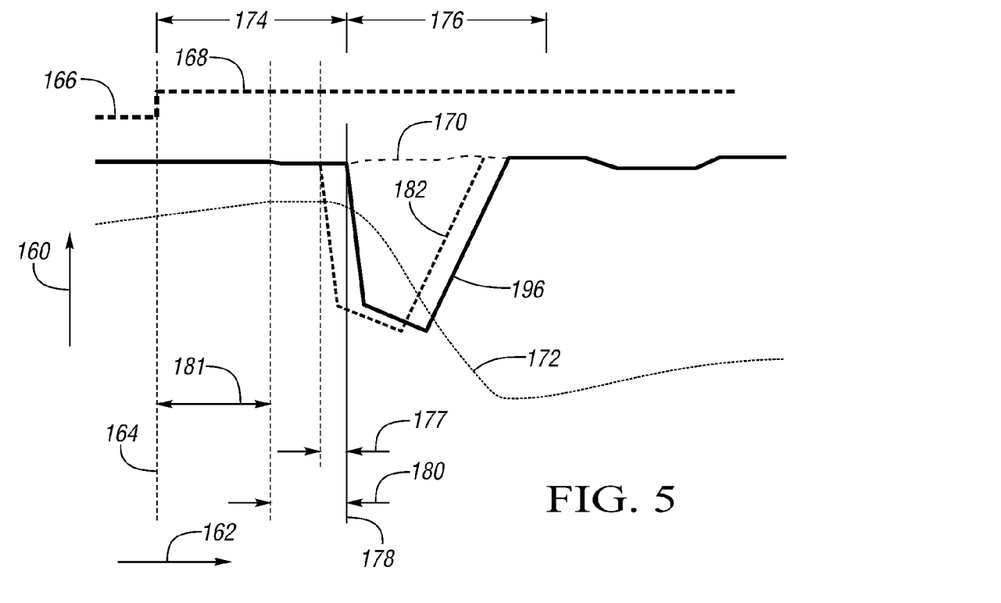
FIG. 5 is a plot of a clutch control algorithm torque request, engine speed, and resulting crankshaft torque versus time, indicating timing requirements for requesting an air torque actuator.

It is typical for the lag time for predicted (throttle) torque reduction to be longer than delays associated with immediate (spark/fuel) reductions. The predetermined response time for spark torque reduction or fuel torque reduction is indicated at 177. The immediate torque request tracks the clutch control algorithm command 182, as the clutch control algorithm is calculated based on spark torque reduction only. The predetermined response time for air torque reduction 180 is a calibratable offset of time from the estimated end of the torque phase 178 of the shift, when the torque reduction is expected to be realized. To account for the range of delays that may be present, the time offset calibration is unique for each upshift and is stored in a lookup table as a function of engine speed and the unmanaged crankshaft torque level 170. The predetermined response time for air torque reduction 180 includes both a calibrated predicted torque transport delay and an initial ramp lead time, further discussed with respect to FIG. 7. There is a specific window of time 181 preceding this offset during which the algorithm 72 must evaluate and decide whether a throttle torque reduction is necessary or desired. The window of time 181 to evaluate the necessity for predicted torque reduction is defined by the interval of time between when an upshift is commanded at time 164, and the predetermined response time for air torque reduction 180.

During this timeframe, the clutch control torque request 182 shown in FIG. 5 is estimated by the clutch control algorithm 73 of FIG. 3 (also referred to as a gearbox model) using known conditions for the desired shift characteristics (such as shift time) to determine the maximum torque reduction expected throughout the shift 183, also referred to as a maximum shift torque management estimate, which is the difference between the expected crankshaft torque without torque modification 170 and the estimated minimum crankshaft torque 184 expected during the commanded shift as determined by the clutch control algorithm 73.

Figure 6:
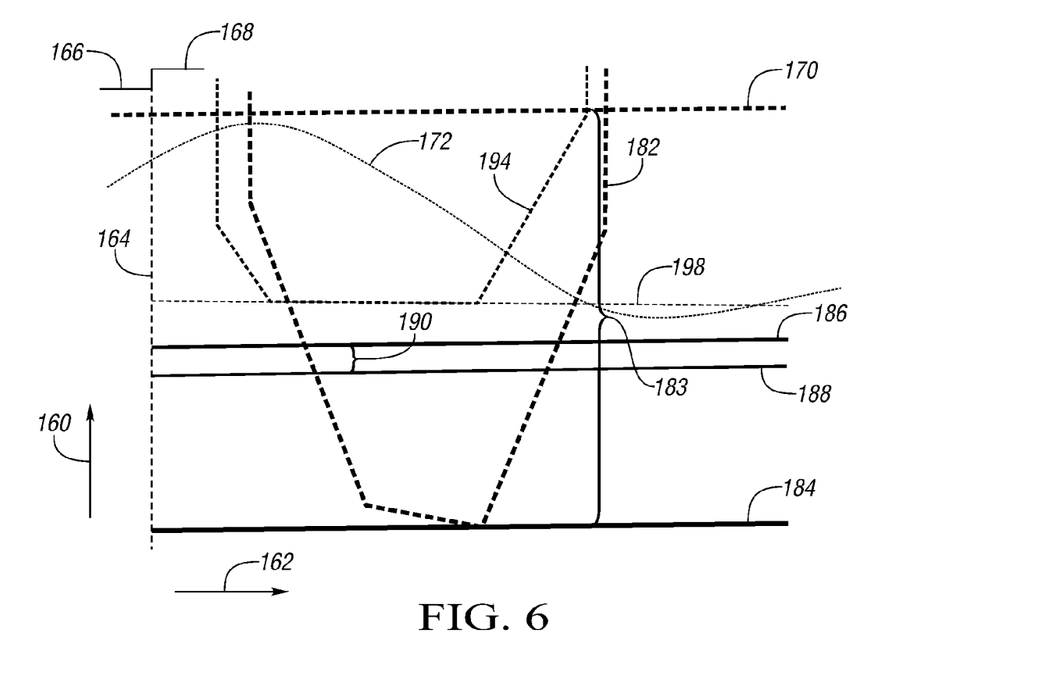
FIG. 6 is a plot of unmanaged crankshaft torque, an air torque request, a clutch control algorithm torque request, and engine speed versus time, indicating a predetermined first torque threshold required for the air torque request as well as a maximum torque reduction expected.

In block 130 of the air torque request determination of the method of block 114, the estimated minimum crankshaft torque expected during the commanded shift 184 is compared to a predetermined first threshold torque level 186. If the estimated minimum crankshaft torque expected 184 is determined to be lower than the first threshold torque level 186, as shown in FIG. 6, then the torque request algorithm 72 of FIG. 3 is armed for a predicted torque reduction, and the method of block 114 moves to block 132. If the estimated minimum crankshaft torque expected 184 is not less than the first threshold torque level 186, then the method of block 114 moves back to the start 126, and air torque reduction is not made during the commanded shift, when the air torque intervention type is set to no intervention. The first threshold torque level 186 is the minimum immediate capacity 188, reflecting the amount of torque reduction that can be accomplished with spark torque actuation alone, plus a calibratable cushion or torque reserve 190. The torque reserve 190 is stored in a look-up table and is unique for each shift (i.e., first gear to second gear, second gear to third gear, etc.) and is a function of engine speed and the unmanaged crankshaft torque 170.

In block 132, the method of block 114 determines whether the estimated time remaining to the end of the torque phase 178 is greater than the predicted response time for the air torque actuator 180, shown in FIG. 5. If the estimated time remaining to the end of the torque phase 178 is greater than the predicted response time for the air torque actuator 180, the modification of crankshaft torque by the air torque actuator will be requested in block 134, and commanded according to the control states described with respect to FIG. 7.

When the algorithm 72 is "armed" for air torque reduction, it is ready to send a signal as indicated by arrow 74 of FIG. 3, with an air torque value and air torque intervention type that reflects air torque reduction. This signal is then ready to be sent at the appropriate time, i.e., the time offset from the expected end of the torque phase 178 by the predetermined response time of the air torque actuator 180. The air torque request is indicated as 194 in FIG. 6, referred to as air torque request command value. Note that the air torque request command value 194 precedes the clutch control algorithm torque request 182. With the addition of the air torque request command value 194, the net crankshaft torque shown at curve 196 of FIG. 5 (when only spark torque actuation is used) will be lowered due to the throttle cut resulting in additional crankshaft torque reduction.

In summary, the following conditions control whether throttle cut (predicted torque reduction) will be enabled and armed. Throttle cut is "enabled" with an upshift command flag and either as a function of commanded shift (i.e., first gear to second gear, second gear to third gear, etc.) or as a function of driver mode (i.e. sport, tap, normal, etc.).

Throttle cut will be "armed" (ready to command a predicted torque request) when (i) throttle cut is enabled, (ii) the estimated minimum crankshaft torque 184 is less than the minimum immediate capacity 188 plus the throttle cut torque reserve 190, and (iii) the estimated time remaining to the end of the torque phase 178 is greater than the predicted response time for the air torque actuator 180.

When it is determined to be necessary, predicted torque management is intended to serve as a coarse adjustment handle to reduce the crankshaft torque level, and consequently reduce the minimum immediate capacity 188 crankshaft torque level because of the revised operating condition. This will facilitate the immediate torque reduction (presumably with spark or other fast torque actuator) to command and achieve the precise torque requested 182 by the clutch control algorithm 73. Because the predicted torque reduction (throttle cut) is being used as a coarse torque control handle, the predicted torque command target torque level 198 commanded is simply a calibratable percentage of the maximum torque reduction expected throughout the shift 183 (desired from clutch control algorithm 73). This calibratable percentage is stored in a unique calibration table for each shift (i.e., first gear to second gear, second gear to third gear, etc.) and is a function of engine speed 172 and the unmanaged crankshaft torque level 170.

Figure 7:
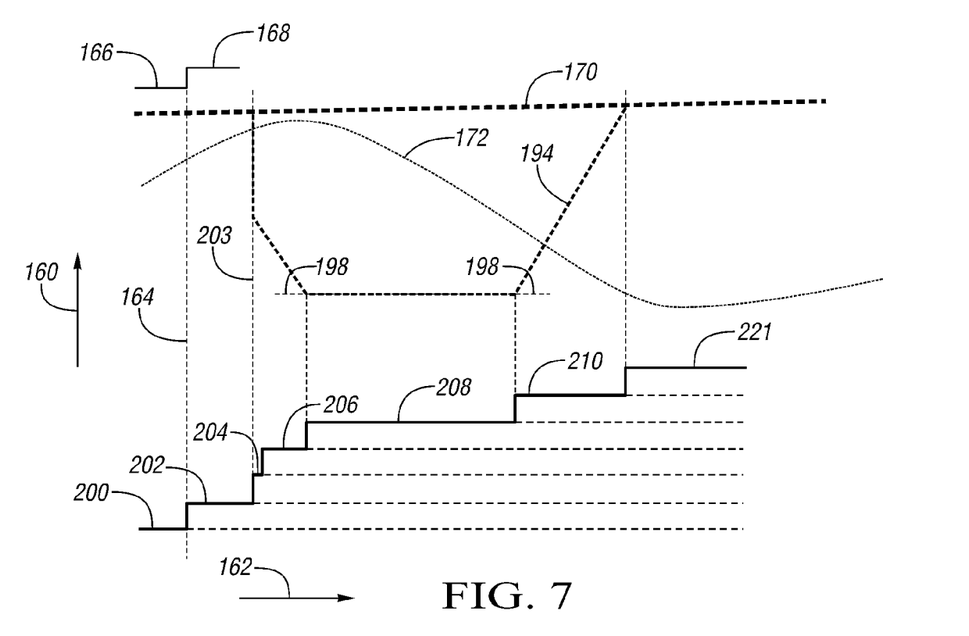
FIG. 7 is a plot of unmanaged crankshaft torque, an air torque request, and engine speed versus time, indicating various states of the air torque request command.
Figure 8:
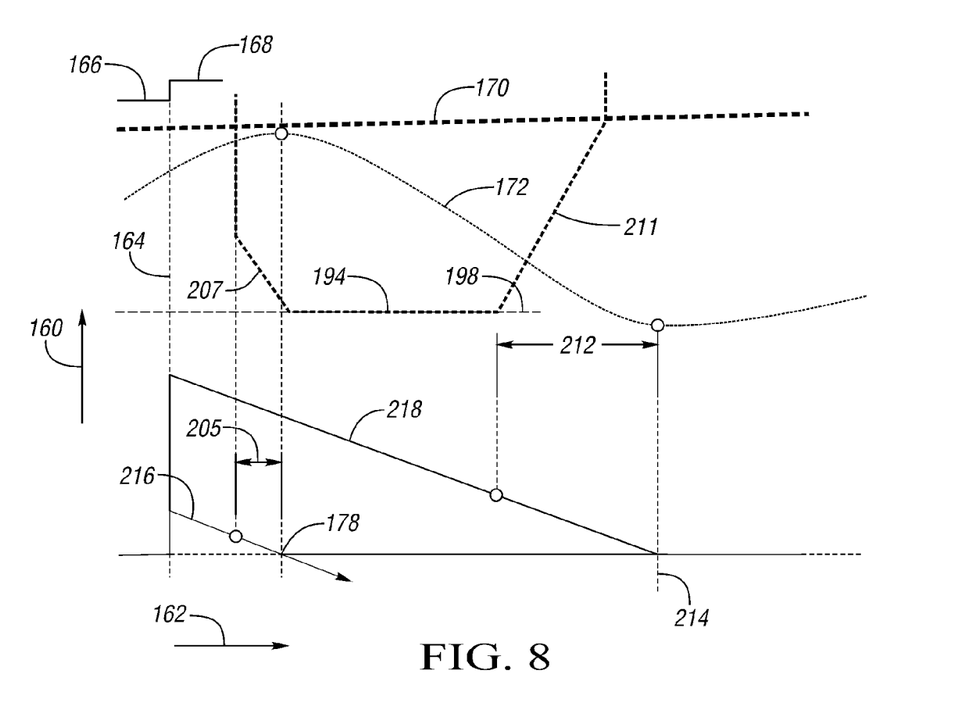
FIG. 8 is a plot of the unmanaged crankshaft torque, an air torque request, and engine speed versus time, indicating timing requirements for various phases of the air torque request profile.

FIGS. 7 and 8 show that the profile of the predicted torque command, the air torque command value 194, is defined by progressing through discrete states triggered by specific events. Prior to a shift event the predicted torque control state is defined as a disabled state 200. When an upshift is first commanded at time 164 and if throttle cut is enabled, the predicted torque control state is set to the delay state 202. The predicted torque control state remains in the delay state 202 until the start 203 of the predicted torque control (if armed) (i.e., the start of the air torque command value 194), or until the window of time 181 of FIG. 5 to arm the throttle cut has elapsed. If the shift is disabled, or the air torque control is not armed in the allocated window of time, the predicted torque control state will return to disabled state 200. Otherwise, the predicted torque control state remains in the delay state 202 until the predicted torque command is triggered at time 203 as a calibratable predetermined response time for air torque reduction 180 before the estimated end of torque phase 178.

The predicted torque control state then moves to an initial step state 204 that is executed for one software loop once the predicted torque request is triggered, assuming that the initial step calibration percentage is greater than zero. During the initial step state 204, the air torque command value 194 steps to a calibrated percentage of the predicted torque command target torque level 198. This initial step percentage calibration is unique for each shift type (i.e., first gear to second gear, second gear to third gear, etc.) and is a function of engine speed 172 and the unmanaged crankshaft torque level 170. The initial step state 204 is triggered as a calibratable lead time offset 205 (shown in FIG. 8) determined before the estimated end of torque phase 178. The end of torque phase 178 is calculated by a predetermined function 216 stored in the clutch control algorithm 73, and is dependent upon clutch characteristics such as clutch fill time, etc. The lead time offset 205 calibration is unique for each shift type (i.e., first gear to second gear, second gear to third gear, etc.) and is a function of engine speed 172 and the unmanaged crankshaft torque level 170.

Following the initial step state 204, the predicted torque control state enters the initial ramp state 206. During the initial ramp state 206, the predicted torque command value 194 ramps out (linearly) to the predicted torque command target torque level 198. The ramp rate 207 calibration is unique for each shift type (i.e., first gear to second gear, second gear to third gear, etc.) and is a function of engine speed and the unmanaged crankshaft torque level 170.

The predicted torque control state remains in the initial ramp state 206 until the air torque request command value 194 ramps down to the predicted torque command target torque level 198. When this happens, the predicted torque control state will progress to the hold state 208. While in the hold state 208, the air torque request command value 194 is held at the predicted torque command target torque level 198.

The air torque request command value 194 remains at the predicted torque command target torque level 198 until the end ramp state 210 is triggered. The end ramp state 210 is triggered as a calibratable lead time offset 212 indicated in FIG. 8 prior to the estimated time to the end of the ratio change 214. The estimated time to the first sync at the end of the ratio change 214 from the time of the initial shift command 164 is a predetermined function 218 dependent upon physical and desired characteristics such as desired shift time, and is calculated in the clutch control algorithm 73.

During the end ramp state 210, the air torque request command value 194 ramps back (linearly) to the unmanaged crankshaft torque level 170. The ramp rate 211 calibration is unique for each shift type (i.e., first gear to second gear, second gear to third gear, etc.) and is a function of engine speed 172 and the unmanaged crankshaft torque level 170. The predicted torque control state remains in the end ramp state 210 until the air torque request command value 194 ramps back to the unmanaged crankshaft torque level 170. When this happens the predicted torque control state will progress to the complete state 221.

Figure 9:
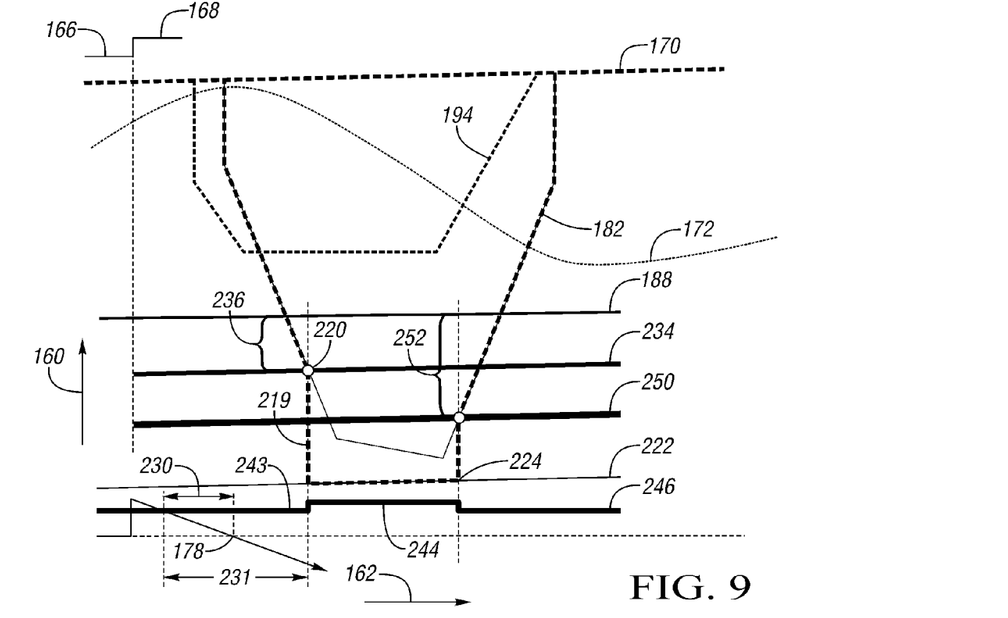
FIG. 9 is a plot of the unmanaged crankshaft torque, an air torque request, an immediate torque request, and engine speed versus time, indicating predetermined torque threshold levels for transitioning between pleasability-limited (spark actuator only) and maximum range (fuel cut and spark actuator) for the immediate torque response type.

Turning now to the method of block 116 detailed in FIG. 4, the determination of whether to request crankshaft torque reduction during the commanded shift via the fuel torque actuator module 56 of FIG. 1 is made "real time" as the commanded shift progresses. This is possible because the fuel cut mechanism is built into the immediate torque reduction "path". That is, because both spark torque reduction and fuel torque reduction are relatively fast torque actuators, they can be commanded to follow and/or be triggered by conditions of the clutch control torque request value 182. The desired input torque level from the clutch control algorithm 73, i.e., the clutch control torque request value 182, is evaluated. If fuel torque reduction is enabled, and if conditions related to the clutch control torque request 182 are satisfied, fuel cut will be requested by changing the immediate torque response type from pleasability-limited (spark only) to maximum range (fuel cut). This is indicated in FIG. 9 where the immediate torque request 219 is the pleasability-limited torque request that follows the clutch control torque request value 182 until point 220, at which time the immediate torque request 219 drops to the crankshaft torque minimum off capacity torque level 222. While the fuel cut is active, the immediate torque response type will remain commanding maximum range. This will request the ECM 32 to turn off fuel to all cylinders 46. During this time, the immediate torque request will command a level equal to the unfueled torque level (the crankshaft torque minimum off capacity torque level 222).

The request to cut fuel will be terminated at time 224 when deactivation conditions (discussed herein) have been satisfied. This will result in the immediate torque response type switching back to pleasability-limited (spark only) and the immediate torque request value being set equal to the clutch control torque request value 182.

Referring again to FIG. 4, the method of block 112 by which the torque request algorithm 72 of the processor 38 of the TCM 34 determines the timing, value and type of fuel torque requests to be sent to the ECM 32 is shown in greater detail, with respect to the determination of the fuel torque request of block 116. The method of block 116 starts at 126. In block 135, a determination is made whether to enable the fuel cut option. "Enabling" the fuel cut option is simply allowing the option of fuel cut to be made under the vehicle operating conditions. There may be predetermined operating conditions where the fuel cut option will not be permitted that will prevent enablement. Assuming that the fuel cut option is enabled during the time period 243 in FIG. 10, the method of block 116 moves to block 136 in which the algorithm 72 determines whether the time remaining until the estimated end of the torque phase 178 is less than a predetermined time threshold 230 indicated in FIG. 9. The time threshold 230 is stored in a lookup table in the TCM 34, and is a unique calibration for each shift (i.e., first gear to second gear, second gear to third gear, etc.) and is a function of engine speed and the unmanaged crankshaft torque 170 shown in FIG. 6). The variable that estimates the time to the end of the torque phase 178 is implemented so that after the torque phase 174 of FIG. 5 is complete, the variable will serve as a time since end of torque phase in the negative direction. Therefore it is possible to set the fuel cut start lead time 231 calibration as a positive number to allow the fuel cut to start before the end of the torque phase, or the fuel cut start lead time 231 calibration can be set negative to allow the start of fuel cut after the end of the torque phase.

If the time remaining until the estimated end of the torque phase 178 is not less than a predetermined time threshold 230, then torque reduction during the shift by the fuel torque actuator will not be permitted, and the method 112 returns to block 126. If time remaining until the estimated end of the torque phase 178 is less than a predetermined time threshold 230, then the method 112 moves to block 138, in which a determination is made as to whether the value of the clutch control torque request 182 is less than a second torque threshold level 234, referred to as the start fuel cut torque threshold. The second torque threshold level 234 is calculated by subtracting a calibrated second predetermined offset 236 from the crankshaft torque minimum immediate capacity 188. The second predetermined offset 236 is a calibrated value based on the commanded shift (i.e., first gear to second gear, second gear to third gear, etc.) and is a function of engine speed 172 and the unmanaged crankshaft torque 170 shown in FIG. 6). This second predetermined offset 236 may be calibrated as a positive or negative value to put the fuel cut activation threshold below or above the crankshaft torque minimum immediate capacity 188.

If the value of the clutch control torque request 182 is not less than the second torque threshold level 234, then the method of block 116 returns to the start 126. If the value of the clutch control torque request 182 is less than a second torque threshold level 234, then the method of block 116 proceeds to block 140, in which a determination is made as to whether a fuel cut request has already been made during the present commanded shift. If a fuel cut request has already been made, then the method of block 116 returns to the start 126. The method thus permits only one fuel cut cycle (fuel on to fuel off) to be executed in a single shift event. This helps to avoid fuel cut dithering (i.e., repeated cycles of fuel cut requests and fuel cut deactivation) during a single shift event.

If it is determined in block 140 that a fuel cut request has not already been made in the current commanded shift, then the method of block 116 proceeds to block 142, in which a fuel cut request is activated (i.e., the fuel torque request type is set to crankshaft torque minimum off capacity torque level 222). Additional mechanisms of blocks 144-152 support the robust operation of the fuel torque request determination of the algorithm 72. Specifically, after fuel cut has been activated in block 142, the method of block 116 monitors additional timing and torque level requirements to determine when to deactivate a commanded fuel torque request for fuel cut. In block 144, the method of bock 116 determines whether the time since the fuel cut request was activated (i.e., time elapsed since time 219) is greater than a second predetermined period of time, which may be calibrated based on the commanded shift, engine speed, etc. If the time since the fuel cut request was made is greater than the second predetermined period of time, then the method of block 116 moves to block 146 and fuel cut is deactivated by switching the immediate torque request type to pleasability-limited.

A separate condition that will cause the fuel cut state to be deactivated is determined in block 148 of the method of block 116. In block 148, a determination is made as to whether the value of the clutch control torque request 182 has risen above a third torque threshold level 250, referred to as the end fuel cut torque threshold. The torque threshold level 250 is calculated by subtracting a calibration offset 252 from the crankshaft torque minimum immediate capacity 188. This calibration offset 252 is stored as a unique calibration table for each shift (i.e., first gear to second gear, second gear to third gear, etc.) and is a function of engine speed 172 and the unmanaged crankshaft torque 170 shown in FIG. 6. If it is determined in block 148 that the clutch control torque request 182 has risen above the third torque threshold level 250, then the method of block 116 moves to block 150, in which it is determined whether a predetermined minimum amount of time has passed since the fuel cut request was activated. The predetermined minimum amount of time may be a value calibrated based on the shift, engine speed, etc. If the predetermined minimum amount of time has passed, then the fuel cut torque request is deactivated in block 146 by setting the immediate torque request type to pleasability-limited.

Figure 10:
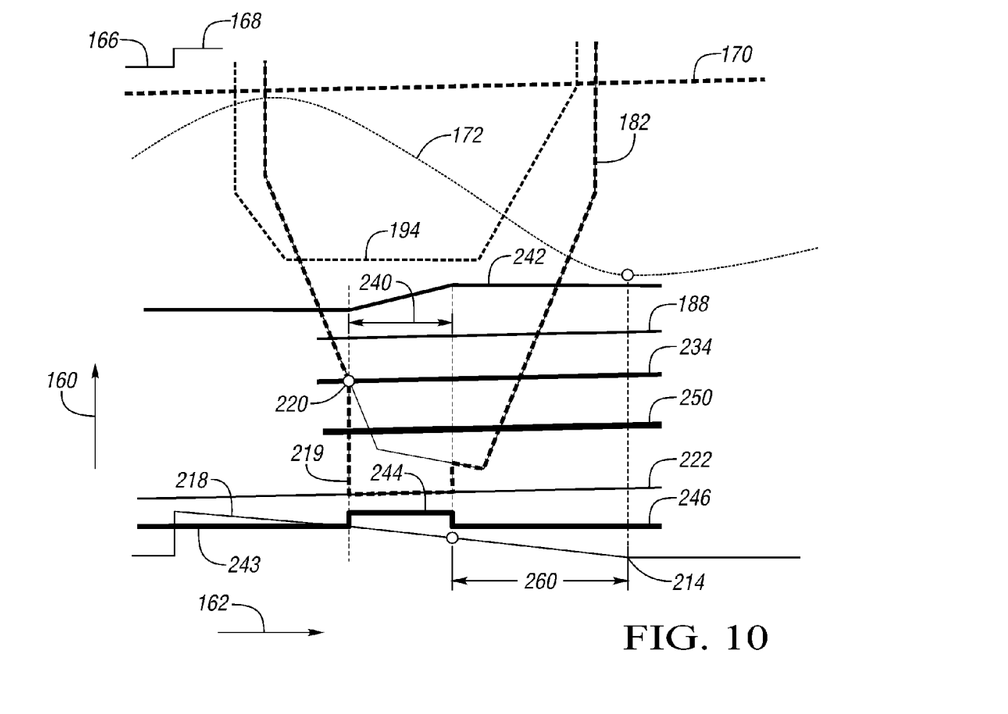
FIG. 10 is a plot of the unmanaged crankshaft torque, an air torque request, an immediate torque request, and engine speed versus time, indicating predetermined timing limitations for activating and deactivating the maximum range (fuel cut) immediate torque response type.

Additionally, in block 152 of the method of bock 116, a determination is made as to whether the estimated time to the end 214 of the inertia phase (i.e., first sync) is less than a time threshold 260 that is stored as a unique calibration table for each shift (i.e., first gear to second gear, second gear to third gear, etc.) and is a function of engine speed 172 and the unmanaged crankshaft torque 170 shown in FIG. 6. If the time to the end 214 of the inertia phase is less than the time threshold 260, then the method of block 216 moves to block 150 to ensure that the predetermined minimum amount of time has passed since the fuel cut request was activated, shown in FIG. 10 as time period 240, with the fuel cut timer indicated as line 242. If so, then the fuel cut request is deactivated by setting the immediate torque request type to pleasability-limited. The fuel cut is inactive during time period 243, active during time period 244, and then deactivated and remaining deactivated during time period 246, as shown in FIG. 10. The method of block 216 repeats the determinations of blocks 144, 148, 150 and 152 until fuel cut deactivation is triggered in block 146.

While the best modes for carrying out the invention have been described in detail, those familiar with the art to which this invention relates will recognize various alternative designs and embodiments for practicing the invention within the scope of the appended claims.

The invention claimed is:

1. A method of controlling engine crankshaft torque on a vehicle comprising:
   comparing a first threshold torque level to an estimated minimum crankshaft torque expected during a commanded shift of a transmission; wherein the first threshold torque level is the sum of: (A) a predetermined minimum crankshaft torque during the shift with torque reduction via a spark torque actuator; and (B) a first predetermined offset;
   requesting crankshaft torque modification by an air torque actuator in addition to the spark torque actuator only if the estimated minimum torque expected during the commanded shift is less than the first threshold torque level;
   comparing a second threshold torque level to torque requested during the commanded shift by a clutch control algorithm; and
   requesting crankshaft torque modification by a fuel torque actuator in addition to the spark torque actuator only if torque requested during the commanded shift by the clutch control algorithm is less than the second threshold torque level; wherein the second threshold torque level is the predetermined minimum crankshaft torque during the shift with torque reduction via the spark torque actuator less a second predetermined offset.

2. The method of claim 1, further including:
   comparing time remaining prior to an estimated end of a torque phase of the commanded shift to a predetermined response time of the air torque actuator; and
   wherein said requesting crankshaft torque modification by the air torque actuator in addition to the spark torque actuator occurs only if time remaining prior to the estimated end of the torque phase of the commanded shift is greater than the predetermined response time of the air torque actuator.

3. The method of claim 2, wherein the predetermined response time is based on at least one of a target gear of the commanded shift, engine speed, and an expected crankshaft torque without torque modification.

4. The method of claim 1, wherein the first predetermined offset is based on a target gear of the commanded shift, engine speed and an expected crankshaft torque without torque modification.

5. The method of claim 1 further comprising:
   determining whether to enable use of the air torque actuator based on the commanded shift and a driver-selected operating mode; and
   wherein said requesting the air torque actuator occurs only if use of the air torque actuator is enabled.

6. The method of claim 1, wherein said requesting crankshaft torque modification by the air torque actuator includes requesting a target torque value that is a percentage of torque reduction requested during a commanded shift by the clutch control algorithm; and wherein the percentage is calibrated based on at least one of the target gear of the commanded shift, engine speed, and an expected crankshaft torque without torque modification.

7. The method of claim 1, wherein said requesting crankshaft torque modification by the air torque actuator includes requesting an air torque value that varies according to different control states triggered by specific conditions as the commanded shift progresses.

8. The method of claim 1, further including:
comparing time from an estimated end of a torque phase of the commanded shift to a predetermined time threshold; and
wherein said requesting crankshaft torque modification by the fuel torque actuator in addition to the spark torque actuator occurs only if time from the estimated end of the torque phase of the commanded shift is less than the predetermined time threshold.

9. The method of claim 1, further comprising:
deactivating requested crankshaft torque modification by the fuel torque actuator if:
time since requesting crankshaft torque modification by the fuel actuator is greater than a predetermined maximum fuel cut activation time; or
an estimated time to an end of an inertia phase of the commanded shift is less than a predetermined lead time and time since requesting crankshaft torque modification by the fuel actuator is greater than a predetermined minimum fuel cut activation time; or
the torque requested during the commanded shift by the clutch control algorithm rises to a torque level greater than a third torque threshold level and time since requesting crankshaft torque modification by the fuel actuator is greater than the predetermined minimum fuel cut activation time; wherein the third torque control level is based on a target gear of the commanded shift, engine speed and an expected crankshaft torque without torque modification.

10. The method of claim 1, wherein said requesting crankshaft torque modification by the fuel torque actuator in addition to the spark torque actuator occurs only if crankshaft torque modification by the fuel torque actuator has not already been requested during the commanded shift, remains active for at least a first predetermined period of time and for no more than a second predetermined period of time.

11. A control system for use with an engine and a transmission in a vehicle comprising:
at least one controller having a processor with a stored algorithm that:
compares a first threshold torque level to an estimated minimum crankshaft torque expected during a commanded shift between gear ratios of a transmission; wherein the first threshold torque level is the sum of: (A) a predetermined minimum crankshaft torque during the shift with torque reduction via a spark torque actuator; and (B) a first predetermined offset;
requests crankshaft torque modification by an air torque actuator in addition to the spark torque actuator only if the estimated minimum torque expected during the commanded shift is less than the first threshold torque level;
comparing a second threshold torque level to torque requested during the commanded shift by a clutch control algorithm;
requests crankshaft torque modification by a fuel torque actuator in addition to the spark torque actuator only if torque requested during the commanded shift by the clutch control algorithm is less than the second threshold torque level; wherein the second threshold torque level is the predetermined minimum crankshaft torque during the shift with torque reduction via the spark torque actuator less a second predetermined offset.

12. The control system of claim 11, wherein said stored algorithm:
compares time remaining prior to an estimated end of a torque phase of the commanded shift to a predetermined response time of the air torque actuator; and
wherein crankshaft torque modification by the air torque actuator in addition to the spark torque actuator is requested only if time remaining prior to the estimated end of the torque phase of the commanded shift is greater than the predetermined response time of the air torque actuator.

13. The control system of claim 12, wherein the predetermined response time is based on at least one of a target gear of the commanded shift, engine speed, and an expected crankshaft torque without torque modification; and wherein the first predetermined offset is based on the target gear of the commanded shift, the engine speed and an expected crankshaft torque without torque modification.

14. The control system of claim 11, wherein said stored algorithm:
determines whether to enable use of the air torque actuator based on the commanded shift and a driver-selected operating mode; and
wherein the air torque actuator is requested only if use of the air torque actuator is enabled.

15. The control system of claim 11, wherein said stored algorithm requests a target torque value that is a percentage of torque reduction requested during a commanded shift by a clutch control algorithm when crankshaft torque modification by use of the air torque actuator is requested; and wherein the percentage is calibrated based on at least one of the target gear of the commanded shift, engine speed, and crankshaft torque without torque modification.

16. The control system of claim 11, wherein said stored algorithm requests an air torque value that varies according to different control states triggered by specific conditions as the commanded shift progresses.

17. The control system of claim 11, wherein said stored algorithm compares time remaining prior to an estimated end of a torque phase of the commanded shift to a predetermined time threshold; and
wherein crankshaft torque modification by the fuel torque actuator in addition to the spark torque actuator is requested only if time remaining prior to the estimated end of the torque phase of the commanded shift is less than the predetermined time threshold.

18. The control system of claim 11, wherein the stored algorithm deactivates requested crankshaft torque modification by the fuel torque actuator if:
time since requesting crankshaft torque modification by the fuel actuator is greater than a predetermined maximum fuel cut activation time; or
an estimated time to an end of an inertia phase of the commanded shift is less than a predetermined lead time and time since requesting crankshaft torque modification by the fuel actuator is greater than a predetermined minimum fuel cut activation time; or
the torque requested during the commanded shift by the clutch control algorithm rises to a torque level greater than a third torque threshold level and time since requesting crankshaft torque modification by the fuel actuator is greater than the predetermined minimum fuel cut activation time; wherein the third torque control level is based on a target gear of the commanded shift, engine speed and an expected crankshaft torque without torque modification.

19. The control system of claim 11, wherein crankshaft torque modification by the fuel torque actuator in addition to the spark torque actuator is requested only if crankshaft torque modification by the fuel torque actuator has not already been requested during the commanded shift; and wherein crankshaft torque modification by the fuel torque actuator in addition to the spark torque actuator remains active for at least a first predetermined period of time and for no more than a second predetermined period of time.

20. A method of controlling engine crankshaft torque during a transmission shift in a vehicle comprising:
- determining different crankshaft torque capacities associated with different respective engine torque actuators, including a spark torque actuator, an air torque actuator and a fuel torque actuator;
- determining a torque actuation range over which to modify crankshaft torque during an oncoming shift of the transmission; and
- requesting crankshaft torque modification during the commanded shift by use of at least one of the air torque actuator and the fuel torque actuator in addition to the spark torque actuator and based at least partially on:
  - the torque actuation range;
  - the crankshaft torque capacities;
  - time remaining prior to a predetermined occurrence during the shift; and
  - a comparison of: (A) torque requested during the commanded shift by a clutch control algorithm; with (B) a level of torque reduction based at least partially on predetermined minimum crankshaft torque during the shift with torque reduction via a spark torque actuator.

\* \* \* \* \*